United States Patent [19]

Friske

[11] Patent Number: 4,532,385
[45] Date of Patent: Jul. 30, 1985

[54] LOAD TRANSPORTING DEVICE AND ELECTRIC SUPPLY TRACK THEREFOR

[75] Inventor: Wolf Friske, Malsch, Fed. Rep. of Germany

[73] Assignee: Eduard Angele, Malsch, Fed. Rep. of Germany

[21] Appl. No.: 300,721

[22] Filed: Sep. 10, 1981

[51] Int. Cl.³ .......................... B60M 1/34; B60L 5/40; E01B 25/26; B61B 13/00
[52] U.S. Cl. ..................... 191/23 A; 191/38; 191/58; 104/94; 104/105; 104/130; 104/170
[58] Field of Search .......... 104/88, 94, 96, 103, 104/121, 130, 165, 170, 172 S, 287, 288, 105, 171; 105/147, 156; 191/23 A, 29 R, 30, 38, 48, 59.1, 58, 83

[56] References Cited

U.S. PATENT DOCUMENTS

| | | | |
|---|---|---|---|
| 2,586,414 | 2/1952 | Barkis | 191/23 A X |
| 2,619,370 | 11/1952 | Leger | 104/170 |
| 3,577,930 | 5/1971 | Rooklyn | 104/103 X |
| 3,780,666 | 12/1973 | Perrott | 104/130 X |
| 3,828,681 | 8/1974 | Christensen et al. | 104/170 X |
| 3,830,163 | 8/1974 | Wright et al. | 104/130 X |
| 3,910,199 | 10/1975 | Ord | 104/89 X |
| 3,929,077 | 12/1975 | Benndahl | 104/288 X |
| 3,946,974 | 3/1976 | Stiefel et al. | 104/130 X |
| 4,194,603 | 3/1980 | Ross, Jr. | 191/58 X |
| 4,220,094 | 9/1980 | Nielsen | 104/170 X |
| 4,418,251 | 11/1983 | Hartman et al. | 191/83 X |

FOREIGN PATENT DOCUMENTS

| | | | |
|---|---|---|---|
| 1576944 | 6/1969 | France | 104/94 |
| 1199470 | 7/1970 | United Kingdom | 104/121 |
| 2069432 | 8/1981 | United Kingdom | 104/288 |

Primary Examiner—Robert B. Reeves
Assistant Examiner—David F. Hubbuch
Attorney, Agent, or Firm—Flynn, Thiel, Boutell & Tanis

[57] ABSTRACT

A transporting device having an overhead track arrangement with straight sections, curved sections, crossing sections and switching sections. A track carriage is movably mounted on the track. A wheeled transport carriage unit moves over a floor surface and is releasably coupled to the track carriage. Structure is provided for effecting a desired movement of the track carriage through switching sections and crossing sections. The transport carriage unit has the drive mechanism thereon and essentially pushes and follows the guide offered by the cooperating track and track carriage.

19 Claims, 15 Drawing Figures

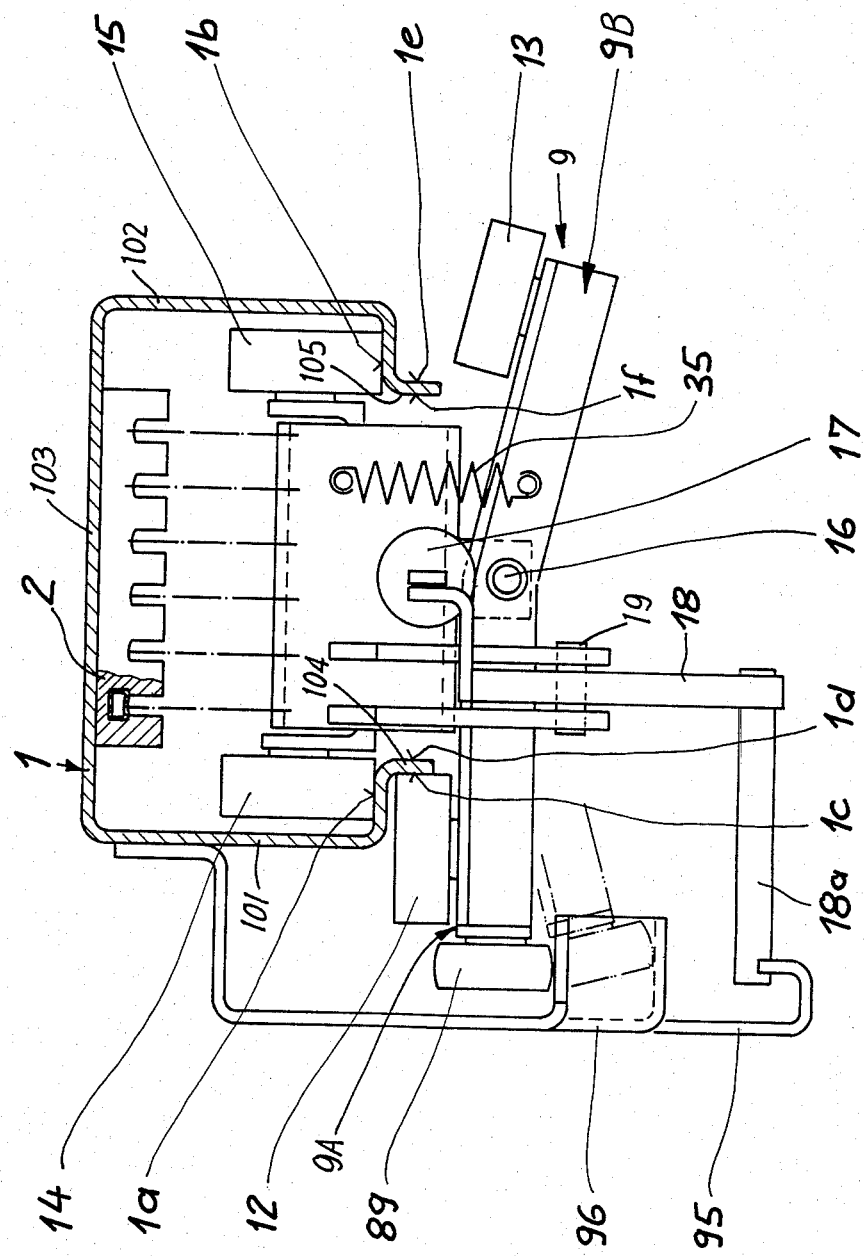

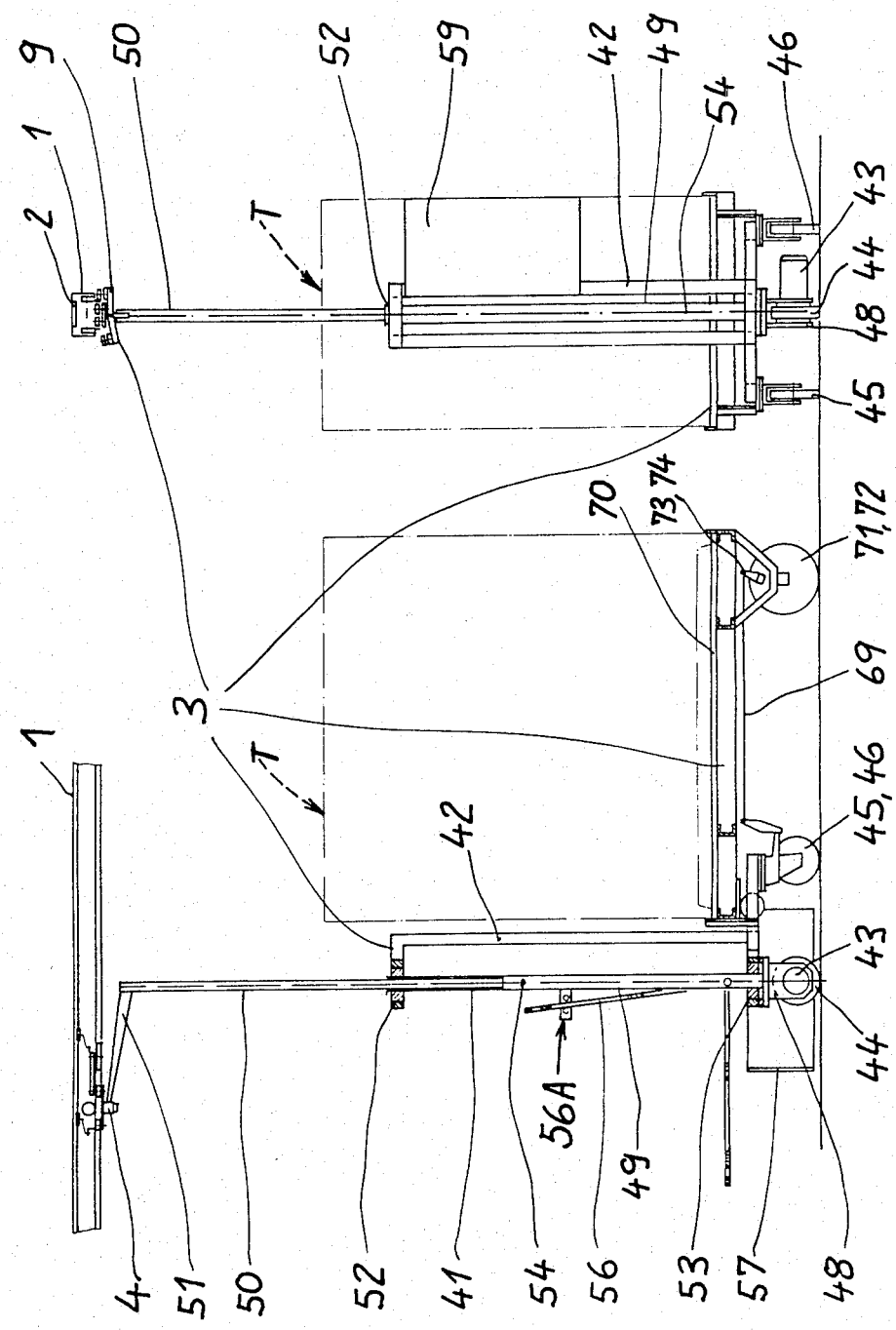

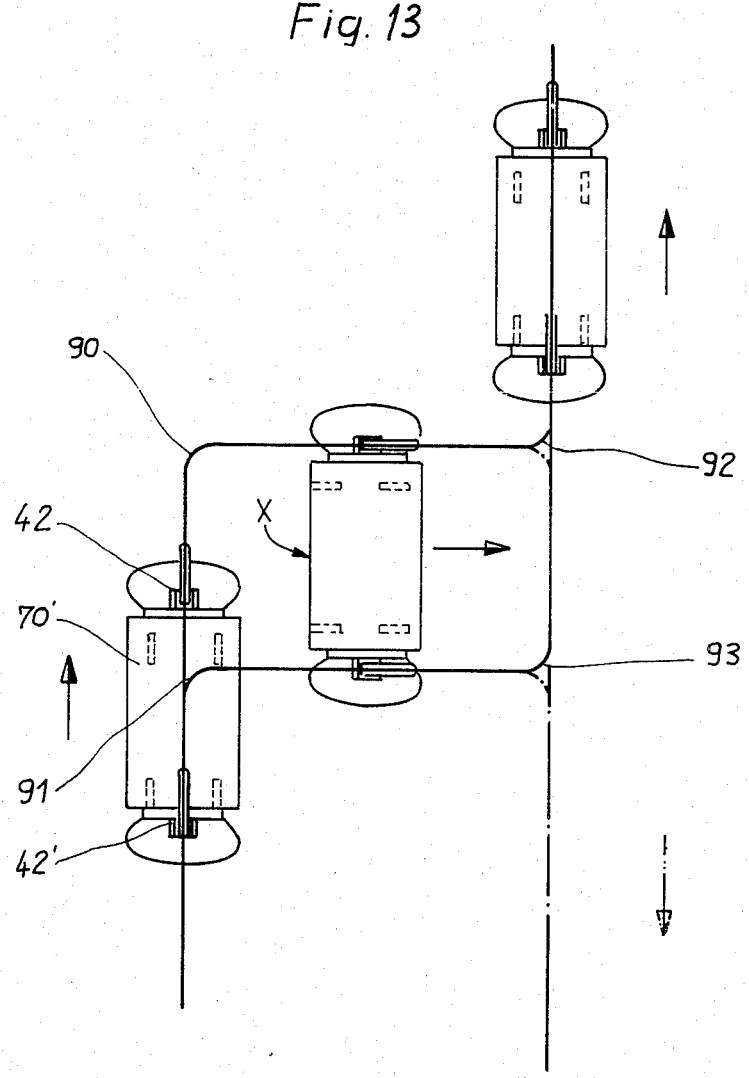

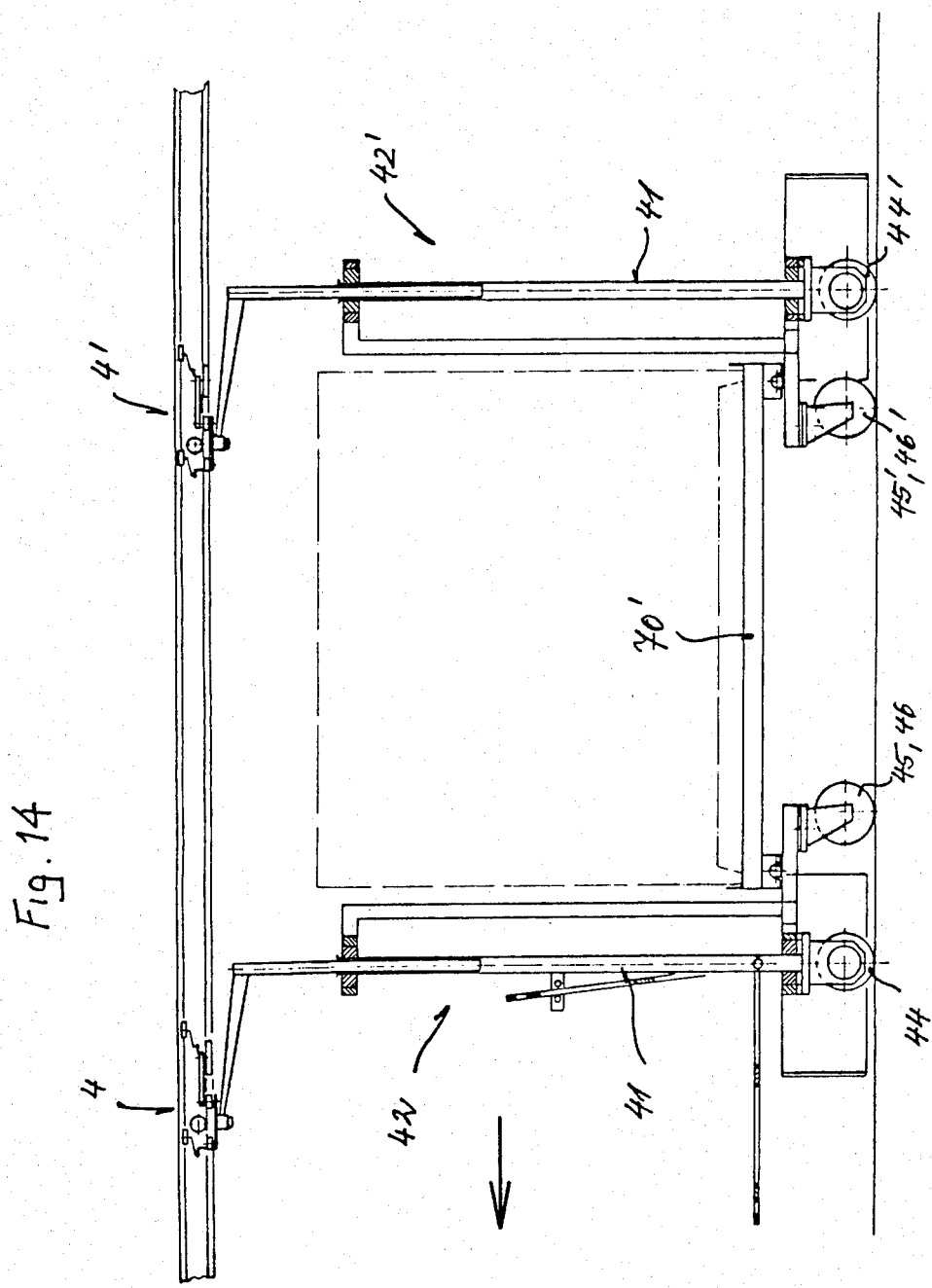

LOAD TRANSPORTING DEVICE AND ELECTRIC SUPPLY TRACK THEREFOR

FIELD OF THE INVENTION

The invention relates to a universally usable transporting device, comprising a track which is mounted overhead with a current supply collector line and any desired number of transport carriage units. The track carriages for the transport carriage units are equipped with an adjusting mechanism, which permits a travel through track switches without the need for a movable adjusting mechanism. This track carriage can assume the guiding function and current supply function for a transport carriage unit which travels on a floor surface, the friction wheel drive of which transmits the driving force onto the floor and the steering and driving unit of which, which is rotatable through 360°, creates the connection to the track carriage.

BACKGROUND OF THE INVENTION

Such a transporting device can be optimally adjusted to the loads to be transported, their dimensions and to the existing space conditions, whereby the possibility of a simple and quick change of the routing and a simple operability and high availability of the entire transporting device exists.

Transporting devices are known, in which the load is transported by a transport carriage which travels on a floor surface and said transport carriage is guided either through a guideway and a current collector line which is laid in the floor and is supplied with current thereby (for example German OS No. 19 53 940) or the transport carriage is guided with the aid of a guide wire which is laid in the floor and a suitable control mechanism on the carriage and the energy supply for the drive is secured through batteries which are stored in the transport carriage (for example German OS No. 23 44 435).

Also transport carriages are known, which are equipped with a vertically positioned, rigid guide rod, which can be coupled to and uncoupled from a circular conveyor which is installed overhead. Furthermore transport carriages are known, which are connected through a sloped steering rod to a tractor which is driven and travels overhead (for example German OS No. 24 25 726).

All of these transporting devices have the disadvantage that their direction of travel is controlled through a power-operated tongue, slide and turning switches or a guide wire embedded in the floor and other control mechanisms. The expense for providing the necessary adjusting devices, the control devices and the input for the electric connecting lines between the switches and the switch box is considerable. In the case of pneumatically operated adjusting devices, the air supply and the required air pressure must be assured additionally through a piping network. A change of the course of the track with a resulting shifting of the switches and their operating and control members and the electric connecting line is expensive and cannot be performed on short notice. A change of the track of transport carriages which are guided on the floor by a guide rail or guide wire is a complicated time-consuming measure, because the existing track must be opened up and after a new one has been properly placed again closed.

A further disadvantage is in the case of the transport carriage which is guided on the floor that the planning of the transporting device must be done prior to a finishing of the floor, so that all necessary recesses in the floor for the subsequent laying of the structural parts can be considered; changes in planning after the floor has been finished result in expensive chisel operations. Furthermore the covers are weakened in their carrying capability by the guide channel. During pouring operations, often the protective cover of the guide rail is damaged and thus same is contaminated on the inside. In order to prevent the guide rail from being deformed in the installed condition by the other floor traffic, same must either be constructed very strongly or the permissible wheel loads of the floor traffic must be limited.

During a breakdown of one of the building and control elements which are responsible for the travelling direction, the entire transporting device or at least a portion thereof is stopped until the interference or problem is corrected. In the case of transport carriages, which are guided by devices in the floor, during such breakdowns covers must be removed in order to permit access to the mechanical or electrical control devices. Thus floor travel is impossible during the time of the breakdown repair in this area, which in most cases results in high production losses. In order to keep the breakdown times as short as possible, such systems require high uses for servicing mechanisms like platforms, footbridges, ladders or pits. In addition a qualified maintenance person must at all times be present.

The basic purpose of the invention is to provide a variably usable transporting device, (1) which can be optimally designed depending on the weight and the dimensions of the load to be transported and the given space conditions, (2) in which the control devices are stored on the transport carriage unit, (3) in which because of the totally passive track the complicated control devices and their connecting lines are not needed and (4) in which installations in the floor are not at all needed. In such a transporting device, breakdowns can only occur on the transport carriage, which can easily be overcome by a simple removal of the carriage. The path of the track can be changed simply and quickly.

This purpose is attained according to the invention by providing a track carriage for a transport carriage unit having an adjusting mechanism which determines the changing or maintaining of the directions of travel, which can be adjusted by an adjusting mechanism which is secured on the track carriage or by a fixedly installed camm on the track which does not have any active adjusting elements, and by the transport carriage unit being supported on wheels engaging a floor surface and with the drive therefor occurring through a device wheel on the floor surface.

The advantages which are achieved with the invention consist particularly (1) in the straight stretches, horizontal turns or switches and crossings being able to be simple and without control devices and always the same in their design, (2) in breakdowns being able to be overcome quickly by a simple removal of the transport carriage units, by a maneuvering of the transport carriage unit travelling on the floor being possible in a narrow space with a steering unit which can be swivelled through 360°. With this it is assured that the transport mechanism can be optimally designed with few components for a special transport task and can be quickly installed.

BRIEF DESCRIPTION OF THE DRAWINGS

The invention will be discussed hereinafter with reference to the exemplary embodiments which are illustrated in the drawings, in which:

FIG. 3 is a cross-sectional view of the track and a front view of the track carriage;

FIG. 4 is a longitudinal cross-sectional view of a tractor unit with a trailer unit and steering unit, which tractor unit travels on the floor surface;

FIG. 5 is a front view of a tractor unit with a trailer unit and steering unit and a cross-sectional view of the track;

FIG. 13 is a top view of a transport carriage unit having two tractors, which units both travel on a floor surface; and FIG. 14 is a view similar to FIG. 4 but showing two drive units, one in front and one in back.

DETAILED DESCRIPTION

Figure 1:
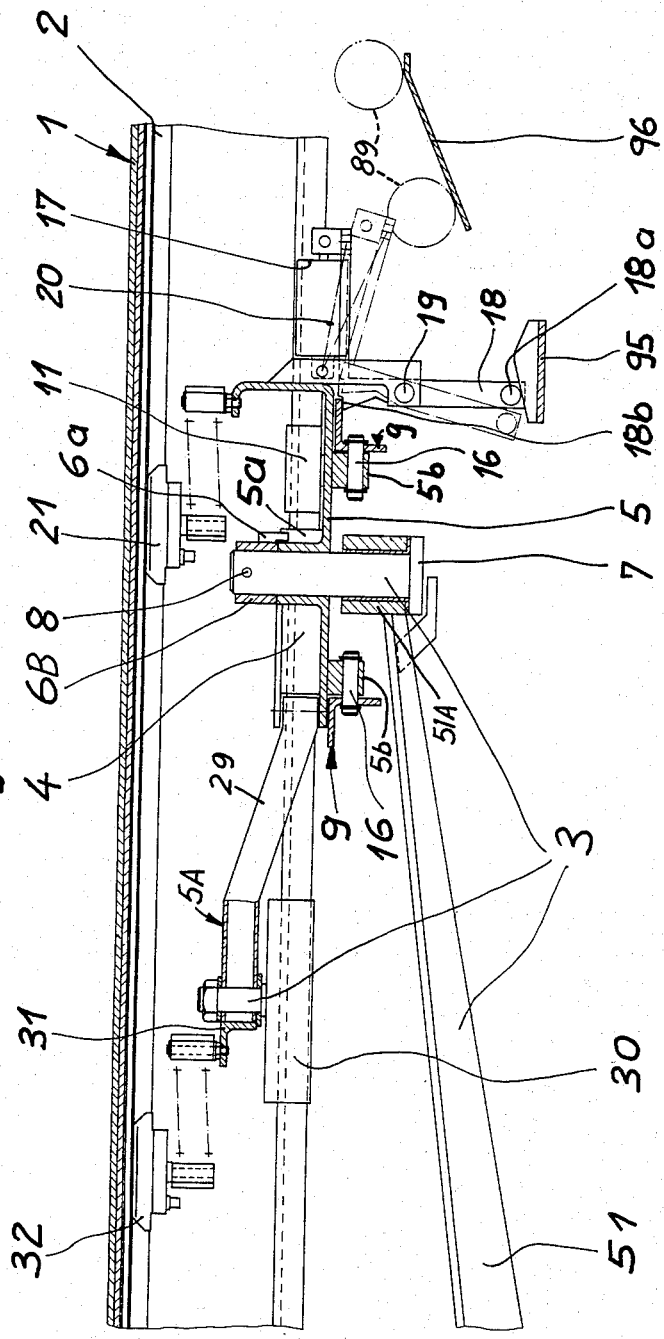
FIG. 1 is a longitudinal cross-sectional view of a track carriage having a trailer connector and steering lever for a transport carriage unit which travels on a floor surface.
Figure 2:
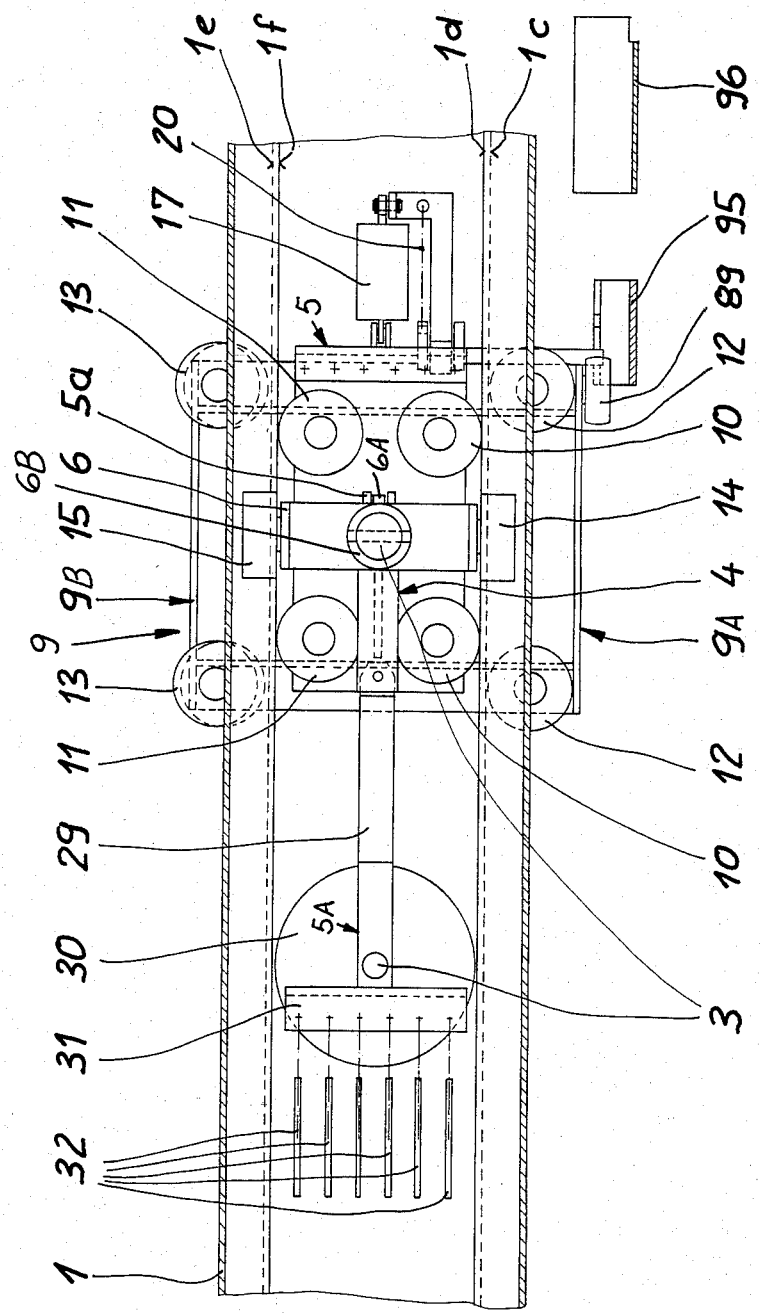
FIG. 2 is a top view of the track carriage having a trailer connector for the transport carriage unit which travels on a floor surface.

A ceiling mounted support and guide rail 1 (hereinafter referred to as a "track") is shown in FIGS. 1 and 2 and a cross section thereof in FIG. 3. The track 1 is of a generally inverted U-shape and has a pair of vertically depending legs 101 and 102 and a bight 103 connecting the legs 101 and 102 at their upper edges. The lower edges of the legs 101 and 102 each have an inwardly bent and horizontally extending flange segment 1a and 1b, respectively, followed by a further vertically depending wall segment 104 and 105, respectively. The wall segment 104 has a transversely facing outer surface 1c and inner surface 1d. Similarly, the wall segment 105 has a transversely facing outer surface 1e and inner surface 1f.

Figure 10:
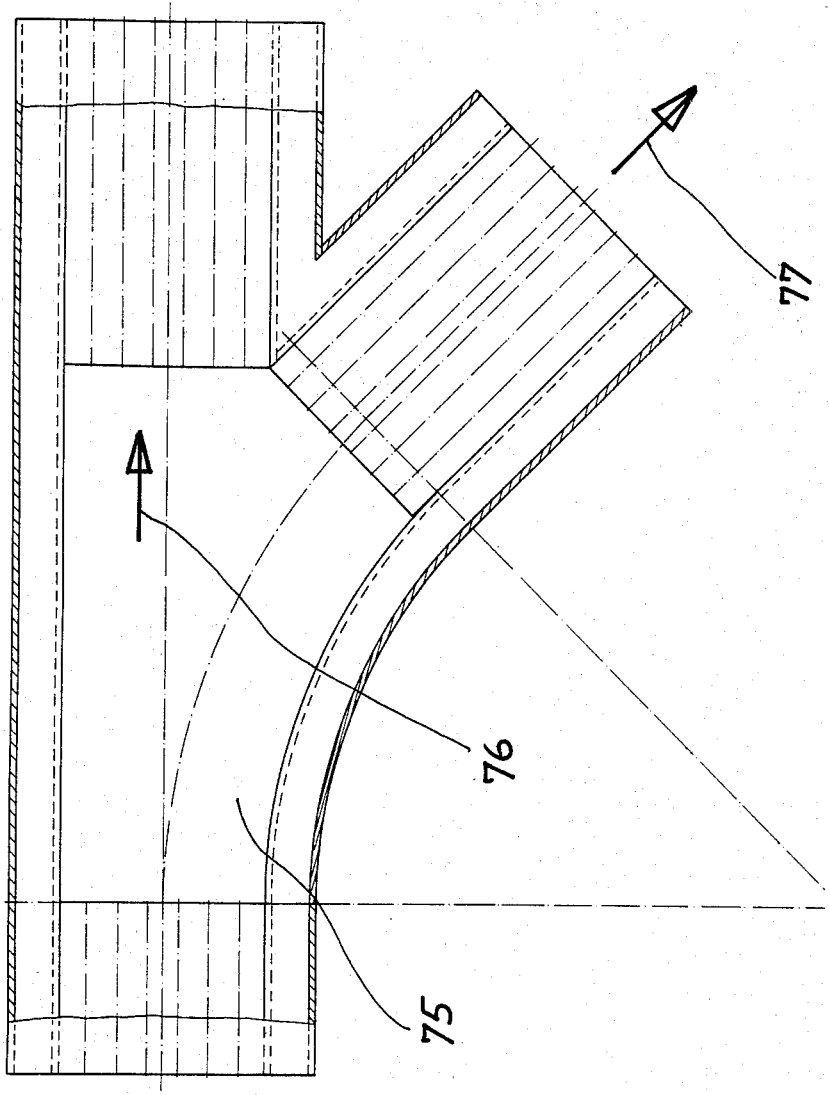
FIG. 10 is a top view, in cross section, of a switch.

A support and guide carriage 4 (hereinafter referred to as a track carriage), which is designed according to FIGS. 1, 2 and 3 for a transport carriage unit 3 which travels on a floor surface, has the purpose of supporting its own weight and the weight of a steering lever 51 on the upper part of a steering unit, namely a square pipe 50 in FIG. 4 through its support rollers 14,15 engaging flanges 1a,1b on the track 1. A support and guide carriage 4 (hereinafter referred to as a track carriage) includes a front frame 5 supporting roller pairs 10,12 and 11,13. The roller pins 10,12 are guided on opposite sides of the wall segment 104 on the right side (the terms "right side" or "left side" refer to the travelling direction which is marked with the arrows, the "right side" being the lower side of the track 1 in FIG. 2) of the track 1, specifically the inner rollers 10 engage the inner surface 1d and the outer rollers 12 engage the outer surface 1c of the wall segment 104 and for straight-ahead and right turn travel. By changing an adjusting mechanism 9, discussed below, on the front frame 5 prior to left turns, the roller pairs 11,13 take over the lead at the left side of the track with the inner rollers 11 engaging the inner surface 1f and the outer rollers 13 engaging the outer surface 1e of the wall segment 105. A front current collector 21 is provided on the front frame 5 of the track carriage 4. The track carriage 4 also has a trailer frame 5A which includes a trailer connector 29 pivotally secured to the front frame 5. A guide roller 30 is secured to the trailer frame 5A and engages the inner surfaces 1d and 1f on the wall segments 104 and 105, respectively. A rear current collector 32 is secured by a connector 31 to the trailer frame 5A. The rear current collector 32 on the trailer frame 5A has the purpose of securing the current supply for the current supply line 2 to a switch box 59 (FIG. 6) provided adjacent a drive mechanism 43 (FIG. 4) on the transport carriage unit 3. The distance from the front current collector 21 to the rear current collector 32 must thereby be sufficiently great that the current supply through the right and left turn switches 75 (FIG. 10) is secured at least through one of the two current collectors.

A central hub 6B is provided on a support 6 secured to the frame 5 and receives therein a connecting bolt 7 having a pin portion 8 thereon and, through the pin portion 8, is connected fixedly to the hub 6B. The hub 6B of the support 6 forms, in the illustrated position (FIG. 1) through a cam 6a and anti-torsion lock 5a, a unit with the carriage frame 5. A support roller 14 is secured on the carriage frame 5 by its axle and a support roller 15 is secured on the support 6 by its axle. The rollers 14 and 15 engage the flange segments 1a and 1b to provide the complete support for the track carriage 4. The horizontal position of the track carriage 4 is maintained through the connecting bolt 7, which is supported in the hub part 51A of the steering lever 51. The two inner guide roller pairs 10,11 are mounted on top of the carriage frame 5 and are secured thereto by their vertical axles.

The adjusting mechanism 9 mentioned only briefly above is pivotally supported by two axially spaced axles 16 (FIG. 1) which lie on the central axis of the track carriage 4. The two axles are secured in two axle mountings 5b which are positioned on the underside of the carriage frame 5. The adjusting mechanism 9 itself consists of a pair of frames 9A and 9B fixedly connected together and pivotally supported on the spaced axles 16. The frames 9A and 9B each extend laterally outwardly in opposite directions from the central portion of the track 1 and track carriage 4 and beneath the respective one of the wall segments 104 and 105 of the track 1. The frame 9A has the pair of spaced outer rollers 12 rotatably mounted on the upper side thereof. The frame 9B similarly has the outer rollers 13 rotatably mounted on the upper side thereof. The leading edge of the frame 9A (rightmost edge in FIG. 2) additionally has a roller 89 rotatably mounted on the outboard edge thereof (FIG. 3) and about an axis extending perpendicular to the longitudinal axis of the track carriage 4. The frames 9A and 9B are inclined to one another as shown in FIG. 3 so that the axles for the rollers 12 and 13 are out of parallel relation. The purpose of this construction will be explained below. The position of the axles 16 and the angled geometry of the adjusting mechanism 9 is determined such that either the guide rollers 12 engage the outer surface 1c of the wall segment 104 or the guide rollers 13 engage the outer surface 1e of the wall segment 105 and can take over the guiding function.

A two arm locking lever 18 is secured on the right front on the carriage frame 5 for pivotal movement about a transversely extending king pin 19. The locking lever 18 is held by a tension spring 20, which is secured at one end to the carriage frame 5 and at the other end to one arm of the two arm locking lever 18, in the "closed" position. The frame 9A is swung upwardly on the right side and is held in this position by a pawl 18b on the locking lever 18, which pawl grips under the frame 9A. As already described, in this position of the frame 9A, track carriage 4 is guided on the right side of the track 1 namely in straight stretches and in the case of turns to the right 77, according to FIG. 10. Prior to turning to the left 76 in FIG. 10, the locking lever 18 is swivelled by an adjusting device 17 which is supported on the front of the carriage frame 5 or an operating rod 18a on the lever 18 engaging a cam 95 which is secured on the track 1 to cause the operating rod 18a which is fixedly connected to the locking lever 18 to be shifted so that the locking pawl 18b is released to permit a lowering of the frame 9A to the broken line position shown in FIG. 3 and a simultaneous raising of the opposite frame 9B.

The frame 9B of the adjusting mechanism 9 is swung upwardly on the left side of the frame 5 by the tension spring 35, which is secured at one end to the carriage frame 5 on the left front side and at the other end to the frame 9B. In this position of the adjusting mechanism 9, track carriage 4 is guided on the left side of the track 1 and follows a left turn or branching 76 according to FIG. 10. After travelling through the left branching 76, the adjusting mechanism 9 is again swung upwardly on the right side by the roller 89 engaging during forward travel a ramp 96 which is secured to the track 1, which upward movement is against the spring tension force of the spring 35 until the locking lever 18 with its pawl 18b snaps in below the frame 9A of the adjusting mechanism 9.

The current collector 21 is secured at the upper front of the carriage frame 5 of the track carriage 4. It is pressed by spring force against the current supply collector line 2 and current is transmitted through electric cables (not shown) to the switch box 59.

Figure 6:
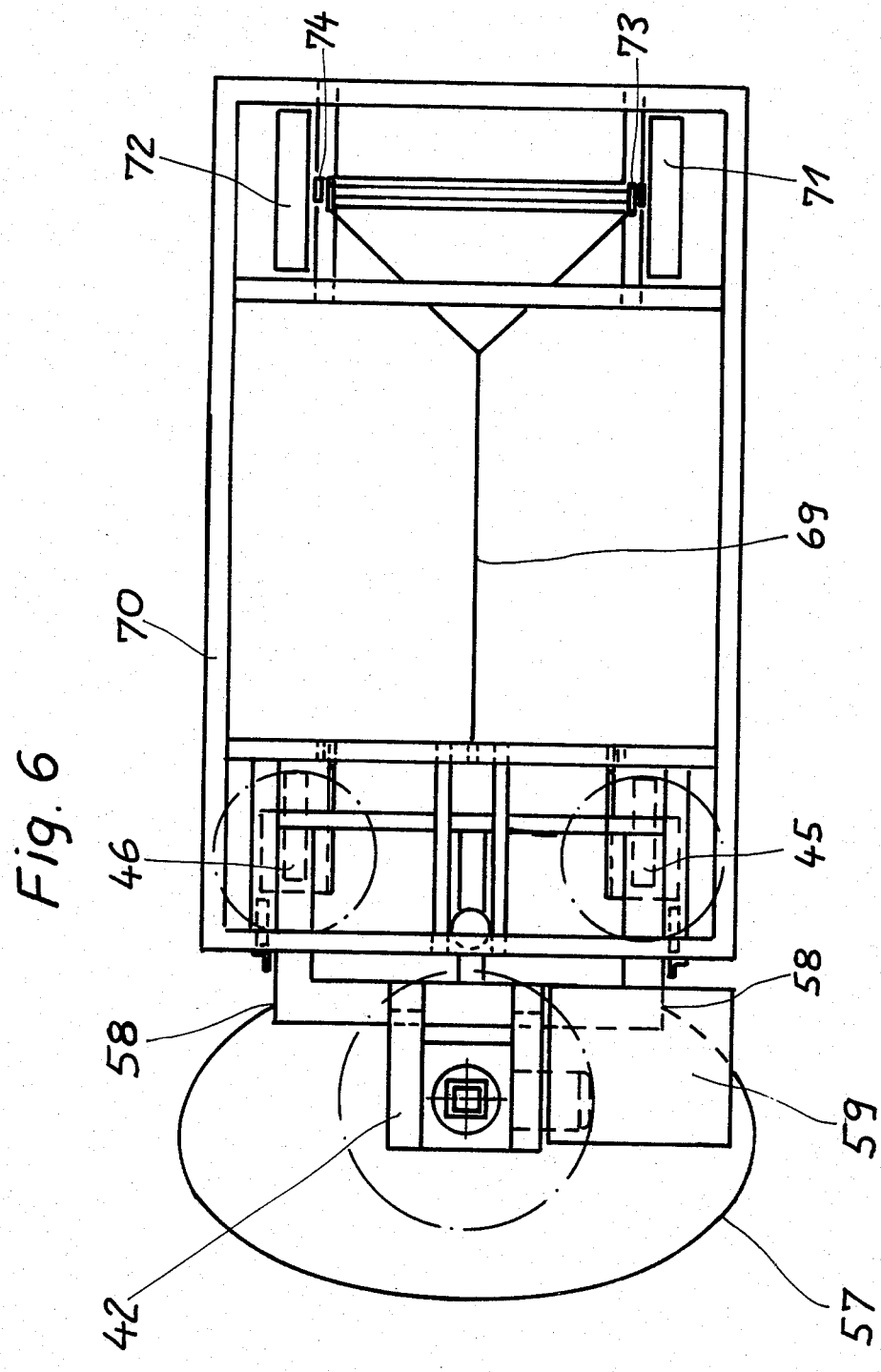
FIG. 6 is a top view of a transport carriage unit which travels on the floor surface.

More specifically, not illustrated electric cables are provided for carrying the electric current from the current collectors 21,32 to the base plate of the carriage frame 5 and are there guided through an opening (not illustrated) downwardly along the steering lever 51 and the steering unit 41 to the switch box 59 (FIG. 6).

The transport carriage unit 3, illustrated in FIGS. 4 and 5, which travels on a floor surface is connected to the track carriage 4 through the steering unit 41. The carriage unit 3 consists of a tractor unit 42 and a trailer unit 70. The tractor unit 42 is equpped with all of the active operating elements for the transport carriage unit 3. Thus it is very simple to separate or the opposite to connect trailer unit 70 from or to the tractor unit 42. The tractor unit 42 can travel alone or, equipped with a trailer coupling, pull as a tractor one or several commercial trailers.

The carriage frame of the tractor unit 42 is constructed such that the steering unit 41 with the drive mechanism 43,44, the swivelling rollers or casters 45,46 and the braking mechanism (FIG. 7B) for the trailer wheels 71, 72 and the switch box 59 can be simply secured thereon.

Figure 7B:
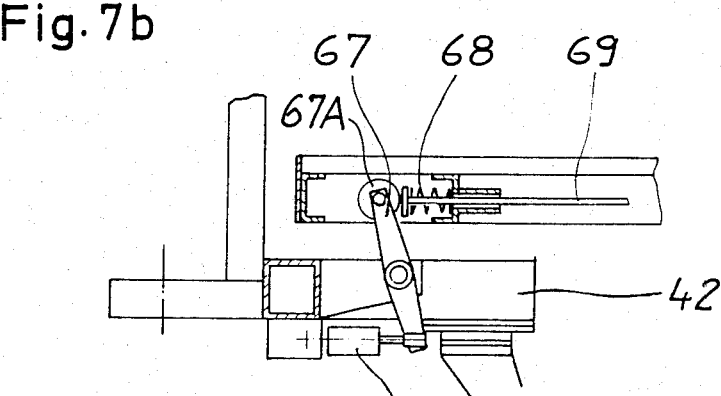
FIG. 7B is a detailed section of the electric brake mechanism of the wheels of the trailer unit.
Figure 7A:
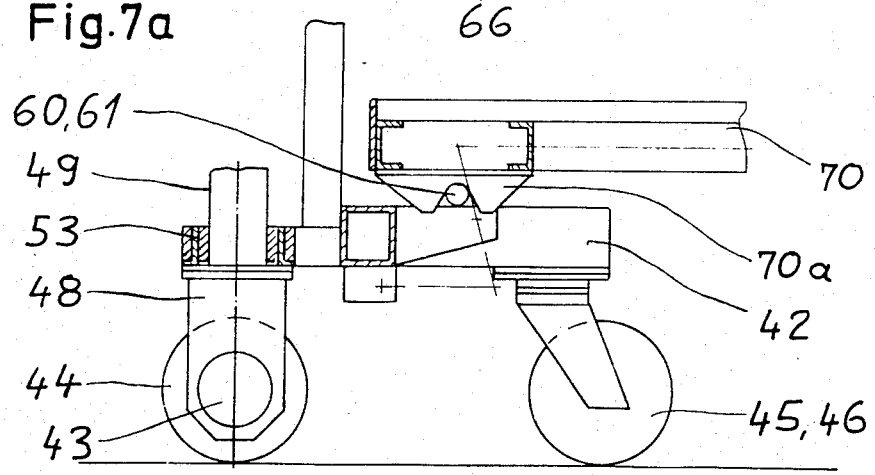
FIG. 7A is a cross-sectional view of the lower part of the tractor unit and the front part of the trailer unit.
Figure 8:
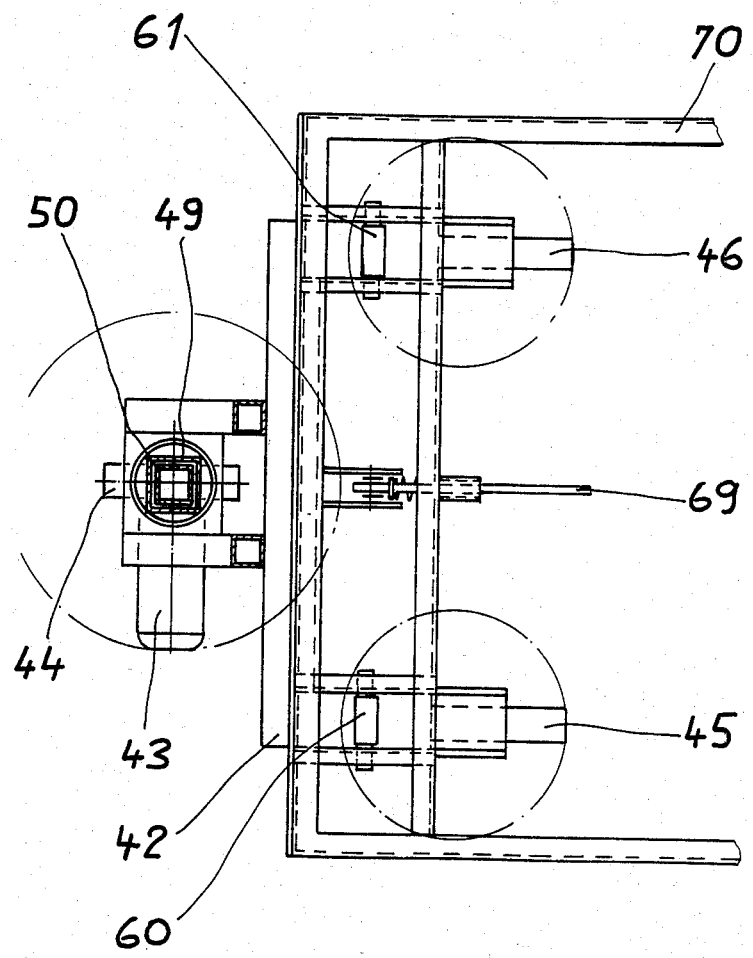
FIG. 8 is a top view of the lower part of the tractor unit with part of the trailer unit.

The load forces, which are introduced by the trailer unit 70 through the coupling unit 60,61 onto the tractor according to FIGS. 7A,7B and FIG. 8 are divided between the casters 45,46 and the drive wheel 44 corresponding with the lever distance between the axle for the trailer wheels 71,72 and the support joints 60,61. With this mechanism the lateral force which acts on the drive wheel 44 is load dependent and the magnitude of the lateral force can be determined through the design of the above-disclosed lever distances corresponding with the drive forces which must be transmitted and the friction relationships between the drive wheel 44 and the floor surface. The drive wheel 44 and the swivelling rollers 45,46 are connected to the tractor in a triangular arrangement. The drive wheel 44 lies thereby in front of and in the middle or on the center line of travel and the swivelling rollers 45,46 lie in the rear and are laterally spaced from the center line of travel, which distance is as wide as possible. The support joints 60,61 have the same distance from the centerline of travel as the swivelling rollers 45,46. This arrangement assures that also in the case of uneven ground conditions all three wheels are loaded in the predetermined manner and the trailer unit 70 is stable on the ground surface.

The steering unit 41 is connected through a square pipe 49, through radial and axial bearing 53, which is located adjacent the bottom of the pipe, and through a radial bearing 52, which is located adjacent the top of the pipe, to the carriage frame of the tractor unit 42. Due to the large distance between the two bearings, it is assured that the steering forces which are introduced by the drive wheel 44 and the steering lever 51 can be absorbed well by the carriage frame of the tractor unit 42. The steering unit 41 forms with the steering lever 51 and a vertically movable square pipe 50, which is positively and slidably connected to the square pipe 49 and steering yoke 48 a single unit with the drive mechanism 43,44. The downward extension of the vertical steering axis 54 coincides with the vertical center axis of the drive wheel 44. It is possible through this arrangement to rotate the steering unit 41 through a 360° angle. This means that the steering unit 41 can follow the track carriage 4 through short radius curves on the track 1, and that with a deflection of 180°, the driving direction is reversed and the transport carriage unit 3 turns in the most narrow of spaces.

The drive mechanism 43,44 consists of a brake motor 43 and a planetary gearing (not illustrated) which transmits the driving forces onto the drive wheel 44. The drive mechanism is coupled together with the stationary part of the planetary gearing and the steering yoke 48.

The tractor unit 42 can, according to FIGS. 7A,7B and FIG. 8, be provided with a braking mechanism, which consists of a two arm lever 67 which is pivotally supported on the frame of the tractor unit 42. The braking mechanism includes a servo device 66 which is supported hingedly on the frame of the tractor unit 42, and which is connected hingedly to an end of one of the arms of the two arm lever 67. Upon operation of the servo device 66, the spring 68 is compressed by a roller 67A which is mounted at the free end of the other arm of the two arm lever 67 and the brake linkage 69 is moved rearwardly and thus the brakes of the wheels 71,72 are deactivated through the levers 73,74 (FIG. 4). The servo device 66 remains in operation as long as it is supplied with current. The brake of the brake motor 43 and the servo device 66 are controlled so that in the case of a power failure, the servo device 66 immediately releases the two arm lever 67 and the spring 68 through the brake linkage 69 and the levers 73,74 operate the the brakes of the wheels 71,72 and at the same time the brake of the motor 43 brakes the drive wheel. With this a secure braking of the carriage mass through three wheels is achieved.

The trailer unit 70 rests with the support webs 70a thereof hingedly, however, nonshiftably on the support joints 60,61 which are secured on the frame of the tractor unit 42.

The trailer unit 70 consists of a profiled rectangular frame with a wooden deck for receiving the transport material T (FIGS. 4 and 5) thereon. The wheels 71,72 are mounted at the rear end of the trailer unit 70, which wheels take over half of the entire weight of the load T. At its front end, it rests with its described mechanisms on the tractor unit 42.

An arc-shaped safety bar 57 of spring steel is mounted at a safe distance from the drive mechanism 43,44 and from the steering unit 41 and is hingedly secured on both sides of the frame of the tractor unit 42. As soon as this safety bar is pressed in at a point on its periphery, the circuit to the drive motor 43 is interrupted through one or several limit switches and its brake is operated.

A tow bar 56 is hingedly mounted on the square pipe 49 and is used when the loaded transport carriage unit 3 is uncoupled from the track 1 and is moved by a tractor into an area which cannot be equipped with a track. In a normal case, the two bar 56 is swung upwardly and its end is held on the square pipe 49 through a fastening mechanism 56A (FIG. 4).

Figure 9:
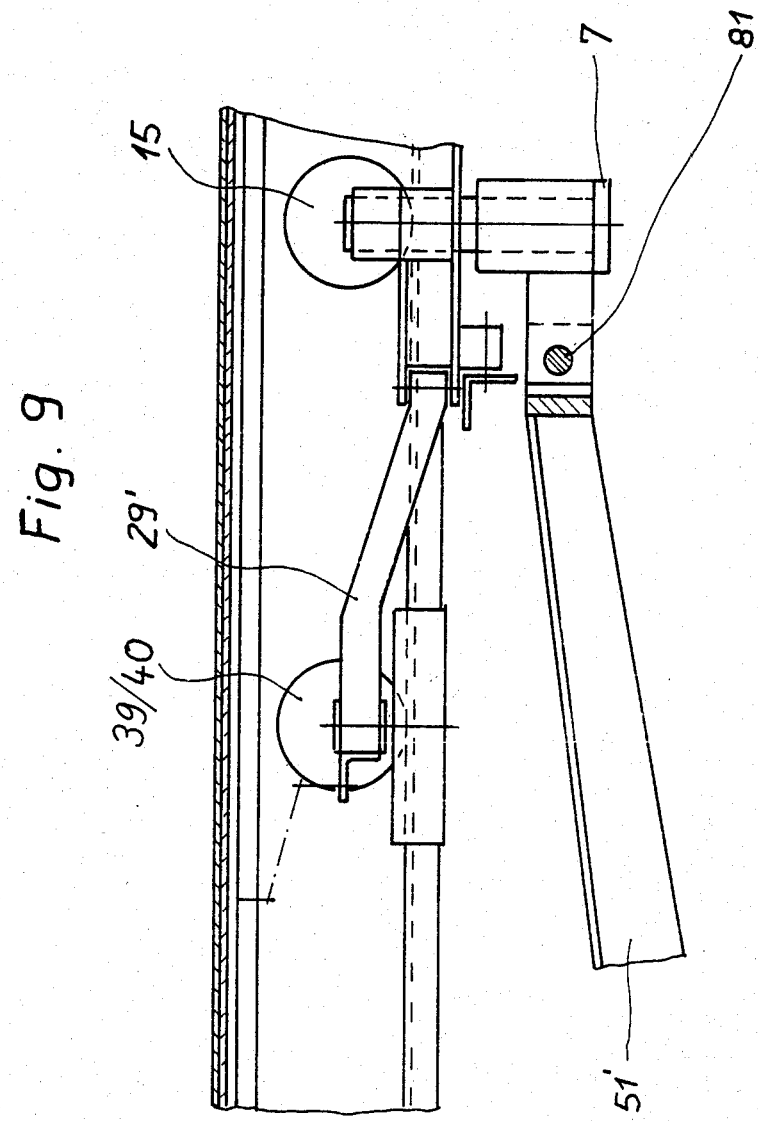
FIG. 9 is a side view of the hinged connection of steering lever and track carriage.

The steering mechanism 41 with its steering lever 51 is rotatably supported about the vertically positioned connecting bolt 7 in a conventional manner. As an alternative thereto, it is possible to equip the steering lever 51 with an additional hinge joint 81, according to FIG. 9, having a horizontal axis and to equip the trailer connector 29 of the track carriage 4 with two additional support rollers 39,40 to engage the upper surfaces of the flange segments 1a and 1b. This arrangement makes it possible to move the track carriage 4 through vertical deflections of the track 1 or to move the transport carriage unit 3 itself over upward and downward inclines whereat the track 1 remains horizontal.

As an alternative to the described transport carriage unit 3, same can be equipped according to FIGS. 13 and 14 with a tractor unit 42 in front and a tractor unit 42' in the rear, which doubles the driving force. The simple platform 70' is guided in front and in the rear by the two steering units 41. With a suitable routing of the track 1 it is thus possible to move the carriage in a relatively narrow space into any desired direction. If this transport carriage unit 3 with two tractors 42,42' according to FIG. 13 is turned at 90° with a track section 90 in front and through a switch 91 at the rear located at the appropriate distance from the drive wheel center axes of the other tractor unit, then a lateral transport is achieved as shown at X in FIG. 13. The transport carriage unit 3 can be rerouted through further simultaneous deflections again to a longitudinal travel or to the backward travel.

Figure 11:
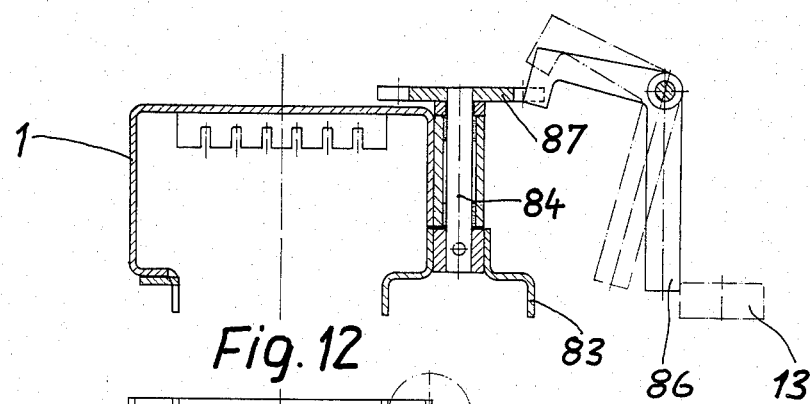
FIG. 11 is a cross-sectional view of a crossing member.
Figure 12:
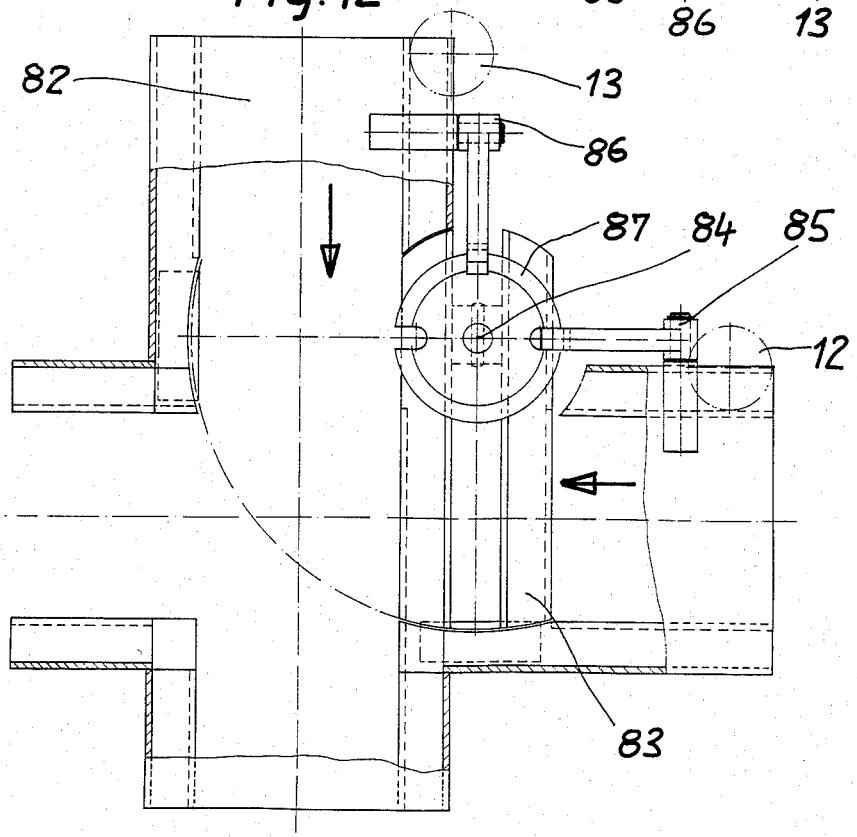
FIG. 12 is a top view of the crossing member.

A track crossing structure is illustrated in FIGS. 11 and 12 and consists of a rigid or fixed rail crossing member 82, a rotating unit 83 rotatable about a vertical axle 84, a two arm locking lever 85,86 and a scanning disk 87 which is fixedly connected to the axle 84, The scanning disk 87 has two sets of diametrically opposed notches in the periphery thereof.

The rotating unit 83 is constructed and supported in a crossing corner with its vertical axle 84 in such a manner that it, in its end position, always closes one side of the guide of the track 1 within the crossing. This rotating unit 83 is operated by the track carriage 4. During the forward movement of the track carriage 4, one arm of the two arm lever 85,86 is lifted to the broken line position of FIG. 11 to remove same from a notch by a guide roller 12,13 which is located at the front on the adjusting mechanism 9 and in this manner the scanning disk 87 is unlocked. The rotating unit 83 is subsequently rotated by one of the guide rollers 10,11 of the track carriage 4, which guide rollers are located on the inside of the track, until they have reached their reciprocal end position and an arm from a second two arm lever 85,86 falls into the second groove of the scanning disk 87 and thus locks the swivelling unit 83.

The control elements are inventively mounted on the carriage unit 3. A desired control can for example be carried out mechanically by means of cams or the like.

In the case of large systems with many branchings of the track 1, the pattern of movement of the transport carriage unit 3 can be stored in the switch box 59. Prior to each branching a reading unit on the transport carriage unit 3 compares the fixed code which is mounted on the track. If the transport carriage unit is supposed to branch off to the left, then a control impulse is produced through an electric program mechanism, which effects a switching over of the adjusting mechanism 9 through the adjusting device 17 and the locking lever 18.

The embodiments of the invention in which an exclusive property or priviledge is claimed are defined as follows:

1. A load transporting device for carrying loads, comprising:

a wheel supported load transport carriage adapted to travel along a floor surface;

overhead electric supply guide track means including plural sections of guide track, at least three of said guide track sections intersecting at means defining a branching, each said guide track section having at least first and second guide means thereon at said branching, a first of said guide means extending continuously in a first direction at said branching, a second of said guide means extending continuously in a second direction at said branching;

a guide carriage movably supported on said guide track and including adjusting means selectively operatively coupleable to only one of said first and second guide means for controlling the direction of movement of said guide carriage through said branching while simultaneously becoming disconnected from the other of said first and second guide means, said guide carriage having plural support rollers, two pairs of guide rollers, each of which engage an inner surface of said guide track means, and two further guide roller pairs, each of which are mounted on said adjusting means and selectively engage selected ones of said first and second guide means, said adjusting means comprising a two arm lever which is hingedly supported on said guide carriage for movement between first and second positions, one guide roller pair being mounted on one arm and movable into and out of operative engagement with said first guide means whereas the other guide roller pair is mounted on the other arm and is movable into operative engagement with said second guide means when said one guide roller pair moves out of engagement with said first guide means and vice versa;

steerable means on said transport carriage for facilitating a change in direction of movement of said transport carriage along said floor surface;

coupling means for coupling said guide carriage to said steerable means and for causing said transport carriage and said guide carriage to travel in the same direction;

controllable drive means powered from the electric supply of said guide track means for effecting a driving movement of said transport carriage along said floor surface and a movement of said guide carriage along said guide track means;

biassing means provided for continually urging said two arm lever from said first position thereof;

releasable locking means provided for holding said two arm lever in said first position; and cooperating cam means for effecting a release of said locking means so that said lever arm will move under the urging of said biassing means toward said second position to cause said guide roller pair on said one arm to move away from said first guide means as said other guide roller pair will move toward said second guide means, said first position being achieved again by a ramp roller mounted on said one arm engaging an inclined ramp mounted on said guide track and thereby during a forward travel moving said two arm lever of said adjusting means against the urging of said biassing means until said two arm lever is again in said first position to again be held by said locking means.

2. The load transporting device according to claim 1, wherein said guide track is U-shaped or C-shaped in cross section with the open side thereof facing downwardly, the legs of the U or C having flanges thereon; wherein said flanges support said guide carriage; and wherein said electric supply of said guide track means includes a current supply line secured to an interior wall of said guide track.

3. A load transporting device for carrying loads, comprising:

a wheel supported load transport carriage adapted to travel along a floor surface;

overhead electric supply guide track means including plural sections of guide track, at least three of said guide track sections intersecting at means defining a branching, each said guide track section having at least first and second guide means thereon at said branching, a first of said guide means extending continuously in a first direction at said branching, a second of said guide means extending continuously in a second direction at said branching;

a guide carriage movably supported on said guide track and including adjusting means selectively operatively coupleable to only one of said first and second guide means for controlling the direction of movement of said guide carriage through said branching while simultaneously becoming disconnected from the other of said first and second guide means;

steerable means on said transport carriage for facilitating a change in direction of movement of said transport carriage along said floor surface;

coupling means for coupling said guide carriage to said steerable means and for causing said transport carriage and said guide carriage to travel in the same direction;

controllable drive means powered from the electric supply of said guide track means for effecting a driving movement of said transport carriage along said floor surface and a movement of said guide carriage along said guide track means; and means defining a track crossing in said guide track means separate from a branching, said track crossing having a swivelling unit pivotally supported on an axle, said swivelling unit having means thereon for enabling a straight through travel of said guide carriage.

4. The load transporting device according to claim 3, wherein said means enabling a straight through travel of said guide carriage includes an axle and a guideway rotatably mounted on said axle between first and second positions;

wherein said track crossing includes a break in the continuity of the support structure for said guide carriage; and wherein said guideway bridges said break to provide a continuous support for said guide carriage through said track crossing, said guideway, in said first position, being in the pathway of said guide carriage and being pivoted toward said second position as said guide carriage moves through said intersection to bridge said break and to thereby provide continuous support for said guide carriage.

5. The load transporting device according to claim 4, wherein the angle between said first and second positions is 90°.

6. The load transporting device according to claim 4, wherein locking means are provided for locking the position of said guideway in at least one of said first and second positions; and wherein said locking means includes automatic unlocking means for automatically unlocking said guideway when it is in the pathway of said guide carriage and for again automatically locking said guideway following a pivotal movement thereof from said first position to said second position.

7. The load transporting device according to claim 4, wherein said guide carriage is maintained in a horizontal position by said steering unit and connected steering lever.

8. A load transporting device for carrying loads, comprising:

a wheel supported load transport carriage adapted to travel along a floor surface, said transport carriage consisting of a tractor unit and a trailer unit, said trailer unit resting on said tractor unit through support joints and is releasably connected to said tractor unit by releasing a safety mechanism;

overhead electric supply guide track means including plural sections of guide track, at least three of said guide track sections intersecting at means defining a branching, each said guide track section having at least first and second guide means thereon at said branching, a first of said guide means extending continuously in a first direction at said branching, a second of said guide means extending continuously in a second direction at said branching;

a guide carriage movably supported on said guide track and including adjusting means selectively operatively coupleable to only one of said first and second guide means for controlling the direction of movement of said guide carriage through said branching while simultaneously becoming disconnected from the other of said first and second guide means;

steerable means on said transport carriage for facilitating a change in direction of movement of said transport carriage along said floor surface;

coupling means for coupling said guide carriage to said steerable means and for causing said transport carriage and said guide carriage to travel in the same direction; and controllable drive means powered from the electric supply of said guide track means for effecting a driving movement of said transport carriage along said floor surface and a movement of said guide carriage along said guide track means, said drive means including a brake motor with a planetary gearing in a drive wheel thereof, said drive wheel being secured on a steering yoke.

9. The load transporting device according to claim 8, wherein said support joints rest on said tractor unit between a drive wheel axle on said tractor unit supporting a drive wheel and a pair of swivelling rollers also on said tractor unit and the distance between the axle of said support joints and the axle of said drive wheel and the distance between the axle of said support joints and the axles of said swivelling rollers effects through these distances an adjustable load distribution onto these three wheels and through the triangular arrangement of the wheels the adjusted load on said drive wheel is maintained also in the case of uneven floor conditions.

10. The load transporting device according to claim 8, wherein said trailer unit has plural wheels equipped with a brake, means for deactivating said brake, said means including levers and linkages and a two arm lever hingedly supported on said tractor unit, an electric braking device hingedly supported on said tractor unit and which is connected to one arm of said two arm lever, the other arm being connected to said linkage, said brake means being, when energized, deactivated during normal operation and immediately during a current interruption said braking means is activated to pivot said two arm lever to effect an operation of the brakes of the wheels through said linkage and that simultaneously the brake of said brake motor stops the drive wheel and thus the carriage mass is stopped simultaneously by the wheels to attain standstill, said braking action being maintained during standstill of said transport carriage.

11. The load transporting device according to claim 8, wherein a trailer connector is provided on said guide carriage and has two support rollers supported on said guide track means, and said steering lever is connected through an additional joint having a horizontally oriented axis to a hub of a vertically oriented connecting bolt.

12. The load transporting device according to claim 8, wherein said tractor unit is equipped with a trailer coupling.

13. The load transporting device according to claim 8, wherein said transport carriage is equipped with a pair of tractor units, one coupled to the front of said trailer unit and the other coupled to the rear of said trailer unit.

14. The load transporting device according to claim 13, wherein said guide track means includes a horizontal turn spaced from a branching, wherein said transport carriage is guided by said two tractor units simultaneously through said horizontal turn and said branching, said guide track means includes a further horizontal turn spaced from a further branching, and wherein said transport carriage can again be guided through said further horizontal turn and said further branching to attain the original forward travel or a backward travel.

15. A load transporting device for carrying loads, comprising:

a wheel supported load transport carriage adapted to travel along a floor surface;

overhead electric supply guide track means including plural sections of guide track, at least three of said guide track sections intersecting at means defining a branching, each said guide track section having at least first and second guide means thereon at said branching, a first of said guide means extending continuously in a first direction at said branching, a second of said guide means extending continuously in a second direction at said branching;

a guide carriage movably supported on said guide track and including adjusting means selectively operatively coupleable to only one of said first and second guide means for controlling the direction of movement of said guide carriage through said branching while simultaneously becoming disconnected from the other of said first and second guide means;

steerable means on said transport carriage for facilitating a change in direction of movement of said transport carriage along said floor surface;

coupling means for coupling said guide carriage to said steerable means and for causing said transport carriage and said guide carriage to travel in the same direction;

controllable drive means powered from the electric supply of said guide track means for effecting a driving movement of said transport carriage along said floor surface and a movement of said guide carriage along said guide track means;

a front current collector secured in front of said guide carriage and a rear current collector secured on a transverse profile of a trailer connector which is hingedly secured to the rear of said guide carriage and which is guided by a roller on an interior wall segment of said guide track, the distance from said front current collector to said rear current collector being sufficiently great that the current supply in said branching areas is assured at least by one current collector for said drive means;

said steerable means including a steering unit which forms an integral unit with said drive means and having a vertically extending swivel axis, said drive means having a drive wheel, the center line of which coincides exactly with said swivel axis, said steering unit including a steering lever hingedly connected to said guide carriage through a vertically positioned connecting bolt, the spaced current collectors being connected through a cable extending along the steering unit to a switch box and thence to said drive means; and said steering unit being pivotally supported in bearings and includes a vertically extending square and hollow pipe secured to said drive means and into which is slidably received a further square pipe to thereby facilitate an accomodating of the variations in distance from said guide track to said floor.

16. The load transporting device according to claim 15, wherein said drive wheel of said transport carriage is connected to a brake means and said steering unit, and wherein the steering forces are applied onto said transport carriage through a swivelling of said steering unit.

17. The load transporting device according to claim 15, wherein said steering unit is pivotal through 360°.

18. A load transporting device for carrying loads, comprising:
a wheel supported load transport carriage adapted to travel along a floor surface;
overhead electric supply guide track means including plural sections of guide track, at least three of said guide track sections intersecting at means defining a branching, each said guide track section having at least first and second guide means thereon at said branching, a first of said guide means extending continuously in a first direction at said branching, a second of said guide means extending continuously in a second direction at said branching;
each of said plural sections being U-shaped or C-shaped in cross-section with the open side thereof facing downwardly, the legs of the U or C each having a horizontally extending first flange thereon and a vertically extending second flange contiguous with said first flange;
a guide carriage movably supported on said guide track and including adjusting means selectively operatively coupleable to only one of said first and second guide means for controlling the direction of movement of said guide carriage through said branching while simultaneously becoming disconnected from the other of said first and second guide means, said guide carriage having plural support rollers on opposite sides thereof and engaging said first flanges and two pairs of guide rollers engaging said second flanges on one side thereof and two further guide roller pairs mounted on said adjusting means and selectively engaging selected ones of said second flanges on a side opposite to said one side, said support rollers on one side thereof becoming unsupported by a first flange in said branching;
steerable means on said transport carriage for facilitating a change in direction of movement of said transport carriage along said floor surface;
coupling means for coupling said guide carriage to said steerable means and for causing said transport carriage and said guide carriage to travel in the same direction;
controllable drive means powered from the electric supply of said guide track means for effecting a driving movement of said transport carriage along said floor surface and a movement of said guide carriage along said guide track means; and
support means on said coupling means for preventing a tilting of said guide carriage about a longitudinally extending axis as said guide carriage moves through a branching whereat said support rollers on said one side of said guide carriage become unsupported by a first flange.

19. A load transporting device according to claim 18, wherein said support means includes a steering lever hingedly connected to said guide carriage through a vertically positioned connecting bolt, said steering lever being connected to said steerable means on said transport carriage.

* * * * *